United States Patent [19]

Most et al.

[11] 4,266,193

[45] May 5, 1981

[54] MEANS FOR DETECTING METAL OBJECTS

[76] Inventors: Lynn W. Most, 1787 N. Rivercrest Rd., Lakeland, Minn. 55043; Allen F. Most, 11701 Leeward Ave. South, Hastings, Minn. 55033

[21] Appl. No.: 941,042

[22] Filed: Sep. 11, 1978

[51] Int. Cl.³ .................... G01R 33/12; G01N 27/72
[52] U.S. Cl. .................................. 324/236; 324/262
[58] Field of Search ............... 324/200, 226, 228, 234, 324/236–238, 261, 262; 340/551, 552, 568

[56] References Cited

U.S. PATENT DOCUMENTS

| 3,361,962 | 2/1968 | Albrecht | 324/243 |
| 3,893,022 | 7/1975 | Kulik et al. | 324/236 |

FOREIGN PATENT DOCUMENTS 895089  5/1962  United Kingdom ..................... 324/236

Primary Examiner—Gerard R. Strecker
Assistant Examiner—Walter E. Snow

Attorney, Agent, or Firm—John S. Munday

[57] ABSTRACT

A device for detecting metallic objects in a container having a substantial quantity of non-metals therein including a frame with metal detecting means mounted on the frame such that the metal detecting means defines a plane of detection. This plane of detection has a length defined as "L" which is substantially equal to the length of the detecting means, and the plane has a width equal to distance "R". A container means of non-metallic material is provided for holding a quantity of non-metal which might contain metallic objects therein. The container has a length less than or equal to L and a diameter less than 2R. Rotating support means for positioning the container in the plane of detection is adapted to rotate the container about an axis of rotation parallel to length L and less than distance R from said detecting means. Alarm means for signalling the presence of a metallic object passing through the plane of detection during rotation of the support means is also provided.

4 Claims, 1 Drawing Figure

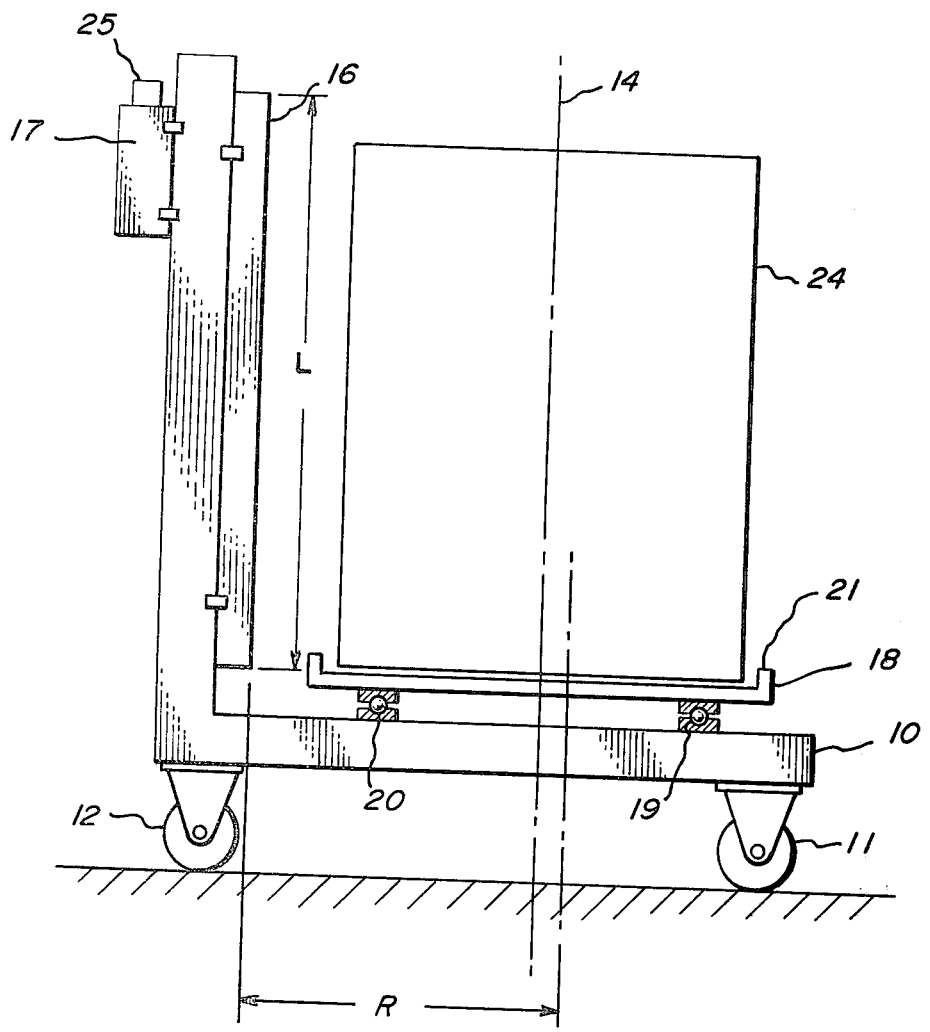

MEANS FOR DETECTING METAL OBJECTS

BACKGROUND OF THE INVENTION

The loss of metallic products such as silverware is becoming a major economic problem in a wide variety of industries. The loss of kitchen utensils in garbage and linen has been calculated as being as high as the cost of an additional employee for food operations. In days of inflation, improper cost control can severely impact upon the likelihood of success of such an organization.

The prevention of such a loss, however, is not economically justified by the addition of another employee to the working force, since that additional cost must still be passed on to the consumer. Furthermore, candidates for the task of sorting through refuse for the purpose of saving a knife or fork are not highly motivated, and the skill applied to the task is often times not satisfactory.

In point of fact, those employees assigned the task of removing the refuse and linen from kitchens and other sources of non-metallic material are most often the lowest paid workers with the least amount of professional pride. Economics force such a result, even though the results are not highly economic.

Similar problems exist in other industries where valuable metallic items become intermingled with less valuable non-metals. For example, expensive surgical instruments are misplaced among operating room linen even though the professional skill of those workers is great. Laundry companies have been known to fail to return valuable clamps, forcepts and scalpels either for failure to clearly identify the proper customer or as compensation for damage or inconvenience incurred in finding the metal goods.

Accordingly, it is an object of this invention to provide a device which can be operated by anyone and which is easily capable of identifying the presence of metallic objects in a quantity of non-metal.

A second object of the invention is to provide a device which more effectively utilizes the labor required to remove non-metallic refuse or other goods.

Yet another object of this invention is to provide a safe, effortless and efficient device for separating metals from non-metals including means permitting ease of movement of the container from work areas to disposable areas.

Other objects will appear hereinafter.

SUMMARY OF THE INVENTION

It has now been discovered that the above and other objects of this invention can be accomplished in the following manner. The present invention relates to a device for detecting metallic objects in a container having a quantity of non-metals therein. The device contains a frame and metal detecting means mounted on the frame. The metal detecting means is adapted to define a plane of detection having a length L substantially equal to the length of the detecting means and a width equal to a distance R extending away from the detecting means.

Also provided as a part of the invention is a non-metallic container means for holding a substantial quantity of non-metal which might contain metallic objects therein. The container has a length or first dimension less than or equal to L, as defined above, and a second dimension or width less than 2R.

As a further part of the device of this invention, a rotating support means is provided for positioning the container means in said plane of detection, such that the support means is adapted to rotate the container about an axis of rotation which is parallel to length L and less than distance R from said detection means. Thus rotation of said support means causes all of the insides of said container means to pass through said plane of detection.

Finally, alarm means which may be both audible and visible are provided for signalling the presence of metallic objects passing through said plane of detection during rotation of said support means.

BRIEF DESCRIPTION OF THE DRAWING

The FIGURE shows a simplified partially sectioned view of the preferred embodiment of this invention.

DESCRIPTION OF THE PREFERRED EMBODIMENT

As shown in the FIGURE a device for detecting metallic objects in a container having a substantial quantity of non-metals is provided. The device has a frame 10 mounted preferably on wheels 11 and 12 for convenience of movement. On the upright portion of the frame 10 is a metal detector means 16 which is adapted to provide a plane of detection. This plane of detection has a length L equal to the length of detector 16, and a width equal to distance R as shown in the FIGURE.

Metal detectors such as shown in the FIGURE, operate on a radio wave principle and are commercially available from C & G Technology, Inc., Phoenix, Arizona. All that is required is that the detector means be capable of identifying metal as it passes through the plane defined by distances L and R. A control box 17 is provided with a battery power source to permit portability. Also provided is a non-metallic container means 24 which has a length or height of less than or equal to L, the height of the detector means 16 and a width or diameter of less than 2R. These dimensions permit placement of the container means 24 such that all of its interior may be scanned for the presence of metal.

Rotating support means 28 for positioning said container means 24 in the plane of detection are provided, as shown in the FIGURE. The support means 18 is adapted to rotate the container 24 about an axis of rotation 14 which is parallel to the length L of the detector means 16 and which is less than distance R from said detector means 16. Bearing means 19 and 20, which may conveniently be a teflon "O" ring in a teflon or other plastic race, permit rotation of the container 24 about axis 14 when positioned on support means 18. Positioning Lip 21 on support means 18 assists in allocating the container 24 in a place to assure the passage of all of the interior of said container 24 through the plane of detection formed by detector means 16. Alarm means 25 is adapted to signal the presence of metallic objects passing through the plane of detection during rotation of support means 18.

Many uses for the device of this invention will become apparent to one skilled in the art upon reading the instant disclosure. Restaurants and hospitals, schools, colleges and food service operations are only some of many facilities which require a simple, easy to operate yet effective means for detecting the presence of metal in and among relatively large quantities of non-metals.

Having thus described the invention, what is claimed is:

1. A device for detecting metallic objects in a container having a substantial quantity of non metal therein, comprising:
   a frame having a vertical portion and a horizontal portion;
   metal detecting means mounted on said vertical portion of said frame and generating a plane of detection having a length L substantially equal to the length of said detection means and a width extending along said horizontal portion of said frame equal to distance R;
   container means for holding a substantial quantity of non metal which might contain metallic objects therein, said container having a length less than or equal to L, and a diameter less than 2R;
   rotating support means on said horizontal portion of said frame for positioning said container in said plane of detection for rotation of said container about an axis of rotation parallel to length L and less than distance R from said detecting means; and
   alarm means connected to said detecting means for signaling the presence of metallic objects passing through said plane of detection during rotation of said support means.

2. The device of claim 1, wherein said frame includes power supply means connected to said detecting means for supplying power to said detecting means.

3. The device of claim 1, wherein said rotating support means further contains positioning means for locating said container means about said axis.

4. The device of claim 1 wherein said frame means further includes wheels adapted to permit movement of said frame.

* * * * *